US005655727A

United States Patent [19]

Hanson et al.

[11] Patent Number: 5,655,727

[45] Date of Patent: Aug. 12, 1997

[54] SLUDGE COLLECTOR METHOD AND DRIVE WITH SHARED REEL FOR TAKING UP AND PAYING OUT CABLES

[75] Inventors: Christopher Dale Hanson, Arvada; Charles Lonnie Meurer, Golden, both of Colo.

[73] Assignee: Meurer Research, Inc., Golden, Colo.

[21] Appl. No.: 443,819

[22] Filed: May 18, 1995

[51] Int. Cl.$^6$ .......................... B01D 21/06; B65H 75/38; F16H 21/40

[52] U.S. Cl. ........................ 242/388; 74/89.22; 210/527; 210/803; 242/388.6

[58] Field of Search ............................... 242/388, 388.1, 242/388.5, 388.6, 378, 378.4; 254/283, 286; 74/89.22, 89.2, 501.5 R; 210/527, 803

[56] References Cited

U.S. PATENT DOCUMENTS

| | | | |
|---|---|---|---|
| 630,962 | 8/1899 | Wood . | |
| 747,113 | 12/1903 | Allen . | |
| 2,589,882 | 3/1952 | Sinner et al. | 242/388 |
| 2,640,682 | 6/1953 | Votypka | 242/388 |
| 2,646,889 | 7/1953 | Dulak | 210/207 |
| 3,134,324 | 5/1964 | Schwaninger | 101/269 |
| 3,321,185 | 5/1967 | Zenke | 242/388 |
| 3,416,176 | 12/1968 | Ravitts | 15/1.7 |
| 3,872,960 | 3/1975 | Gabor | 197/53 |
| 4,198,871 | 4/1980 | Dunn et al. | 74/37 |
| 4,401,576 | 8/1983 | Meurer | 210/803 |
| 4,477,939 | 10/1984 | White et al. | 15/246.5 |
| 4,957,014 | 9/1990 | Burke | 74/89.22 |
| 4,986,141 | 1/1991 | Meurer | 74/89.22 |
| 5,388,480 | 2/1995 | Townsend | 242/388.5 |

*Primary Examiner*—John M. Jillions
*Attorney, Agent, or Firm*—Chester E. Martine, Jr.

[57] ABSTRACT

Apparatus for simultaneously taking up and paying out first and second ends of respective first and second cables is provided for traversing a carriage in a clarifier basin. Each of the cables has the same active length. A reel has a cylindrical drum, opposite ends, and a pair of cable retainers. One of the retainers is adjacent to one of the opposite ends and on a first diametric side of the drum. The other of the retainers is adjacent to the other of the opposite ends and on a second or opposite diametric side of the drum. The second diametric side is opposite to the first diametric side. In a method of the invention, the first end of the first cable is secured to the one retainer the drum is adapted to receive all of the active length of the first cable in one layer thereon or all of said active length of the second cable in one layer thereon or a wound portion of the active length of each of the cables in one layer thereon, with the wound one layer portions sharing the drum in side-by-side relation. The method winds the active length of the first cable completely onto the drum and then the second cable is secured to the other retainer. The drum is then rotated to pay out the first cable and take up the second cable and traverse the carriage in the basin.

14 Claims, 8 Drawing Sheets

FIG. 9

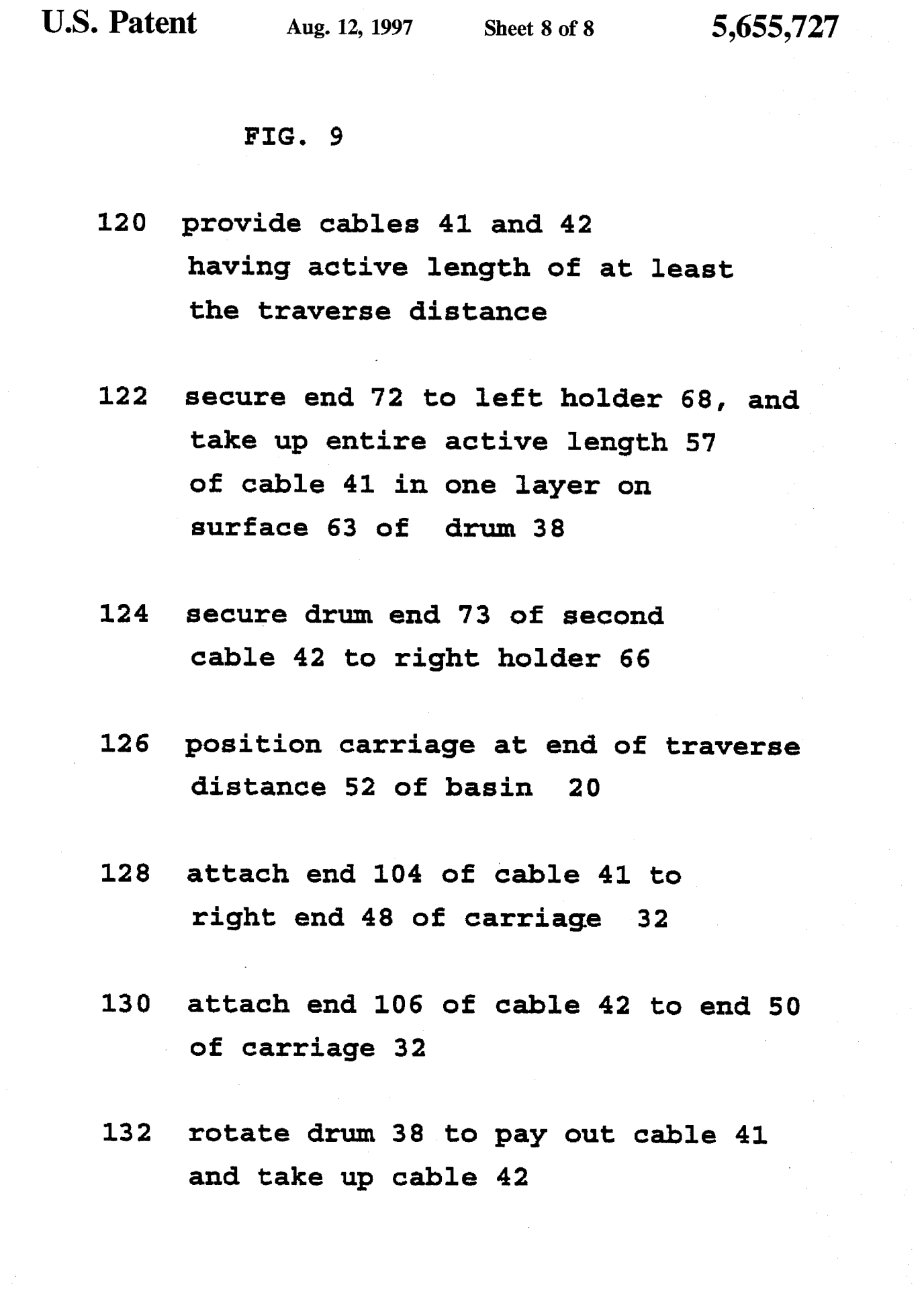

120 provide cables 41 and 42
having active length of at least
the traverse distance 122 secure end 72 to left holder 68, and
take up entire active length 57
of cable 41 in one layer on
surface 63 of drum 38

124 secure drum end 73 of second
cable 42 to right holder 66

126 position carriage at end of traverse
distance 52 of basin 20

128 attach end 104 of cable 41 to
right end 48 of carriage 32

130 attach end 106 of cable 42 to end 50
of carriage 32

132 rotate drum 38 to pay out cable 41
and take up cable 42

SLUDGE COLLECTOR METHOD AND DRIVE WITH SHARED REEL FOR TAKING UP AND PAYING OUT CABLES

SPECIFICATION

BACKGROUND OF THE INVENTION

1. Field of the Invention

This invention relates to reciprocating equipment along a work path, and more particularly to a reel providing a drum having one surface which is shared by a single layer of a take up cable and by a pay out cable during reciprocation of the equipment in a clarifier basin for collecting sludge.

2. Discussion of Prior Art

In the past, clarifier basins have been provided with sediment collecting devices that move on a track fixed to the floor of the basin. In one such device, patented by Applicant in U.S. Pat. No. 4,401,576, a carriage is provided for movement along the track. The carriage is moved by a stepping mechanism that grips the track and moves the carriage relative to the track. Although such stepping mechanism has been commercially successful, mechanisms that are located under the water are inherently difficult to maintain because the track is located under water where sediment or sludge collects on the floor of the clarifier basin.

In other devices for removing sludge from the floor of clarifier basins, floats are pulled alternately in opposite directions across the surface of the clarifier basin. Pipes extend from the floats to the floor for sludge collection. The floats are pulled by a cable which has first and second ends. The first cable end is wound in one direction on a winch and the second cable end is wound in an opposite direction on the winch, such that rotation of the winch in one direction unwinds (pays out) the first end of the cable and winds up (takes up) such second end of the cable to pull the float in one direction across the basin. Reversing the direction of rotation of the winch reverses the direction in which the float is pulled across the basin. In a device of this type disclosed in U.S. Pat. No. 3,416,176 issued in 1968, the winch has a fixed diameter drum. Both the first and the second ends of the cable are tightly wound on the drum of the winch. In this device, if the travel of the float is long enough to require the cables to wind on themselves and form more than one layer on the drum, the length of cable unwound from the now-larger diameter on the drum will exceed that wound directly on the drum. To compensate for the unequal diameters and the resulting unequal lengths taken up and payed out, one requires use of spring-biased pulleys, for example.

In other drives for reciprocating devices along a path, one end of a cable is wound in one direction on a drum and the other end of the cable is wound in the other direction on the drum. In one such unit disclosed in U.S. Pat. No. 630,962 issued in 1899, the drum is provided with three surfaces, the outer two of which surfaces are conical in shape for receiving a pair of cables that are wound in a first direction. The other surface, a central cylindrical drum, receives a sounding line that is wound in a direction opposite to that of the cables. This unit requires the use of cable guides that are provided on a lead screw for guiding the cables onto selected and controlled portions of the conical surfaces.

In the art of moving or lifting objects, the single drum of an ordinary hoist has been provided with a ring that divides the single drum into two sections. In one such apparatus disclosed in U.S. Pat. No. 747,113 issued in 1903, a button has been provided on such ring and is used for engaging a rope so that as both sections of the drum are rotated in the same direction, one section of the drum winds up one length of the rope on one section of the drum, while another length of the rope unwinds from the other section of the drum.

In other drives for positioning transducers along a longitudinal path, such as disclosed in U.S. Pat. No. 4,198,871 issued in 1980, a capstan is driven by a stepper motor through a maximum angle of 180 degrees in either of two directions. The capstan is provided with a cylindrical surface to which opposite ends of a flexible, steel belt are secured at separate, axially spaced locations on the capstan. Those ends of the belt are wrapped in opposite directions on the capstan. In practice the rotation of the capstan is limited to 135 degrees as the rotation of the capstan in one direction unwinds one end of the belt from its separate location on the capstan, and winds up the other end of the belt at its separate axial location on the capstan. Because of the limited rotation of the capstan, each of the separate belt ends does not wrap onto itself as it is wrapped on the capstan. Because of the separate axial locations of the belt ends, combined with such limited amount of rotation, each separate belt end does not wrap on the capstan to the location of the other belt end.

In a high speed printer disclosed in U.S. Pat. No. 3,872,960 issued in 1975, a motor drives a helically grooved pulley which has attached to it left and right cable segments of equal length. The other ends of the cable segments are attached to a movable carriage. One pulley of this system is spring biased to remove from either of the cables any slack which might occur due to long-term temperature drift.

SUMMARY OF THE PRESENT INVENTION

In Applicant's experience with devices for collecting sludge from clarifier basins, one experiences difficulty maintaining driving devices located under water because of the under water location. Maintenance must be performed when the basin is empty (and thus shut down) or a diver must go under water to make the repair. This experience indicates that attempts to mount such driving devices above the water often result in using heavy power screws that interfere with operations above the water level. In such experience, when customary, multiple, separate reels have been used for winding up cables that move such devices, complex drum shapes have been required to equalize the diameter of the cable on a full reel relative to that of an empty reel. Additionally, in such complex drum shape systems of the type in U.S. Pat. No. 747,113 noted above, Applicant's analysis is that each separate section of the drum must be long enough and of sufficient diameter to receive the entire length of the rope which is to be wound on and unwound from the drum. This requirement increases the overall length of the drum and causes the ropes to approach the drum at a large angle from a fixed pulley. With the approaching ropes at such large angle, there is a tendency for the ropes to overlap and form more than one layer on the drum as they are wound on the reel. Thus, the different lengths of the rope are wound and unwound respectively from different diameters on the drum. As a result, tensioning devices such as spring biasing techniques are required to render equal the actual lengths of the rope which are used to hoist the object or to otherwise apply tension to both cables. Such tensioning devices increase the cost of the hoist.

In certain sludge collection operations, flat belts are not suitable for use in place of cables, as in U.S. Pat. No. 4,986,141 issued in the name of Applicant. In other uses of such flat belts, as in U.S. Pat. No. 4,198,871 described above, the capstan-stepper motor systems are of limited application due to the restriction that the capstan not rotate more than 180 degrees. Accordingly, there is still a need in the art of clarifier basin equipment, such as sludge collectors which are traversed in a path in clarifier basins, for a simple, reliable drive located out of the liquid and other materials (e.g., sludge) that are in the basin and which does not require use of cable tensioners or complex drum shapes or guides for the cable as it is wound on the drum.

Accordingly, in the present invention a drum of a reel has a surface which receives, in a single layer, an entire length of a first cable which is active, or taken up, in traversing a sludge collector in a first direction along its entire traverse path, and that surface also receives, in a single layer and in exchange for the first cable, an entire length of a second cable which is active, or taken up, in traversing the sludge collector in a second direction opposite to the first direction along the entire traverse path, such that both the first and the second cables are wound on that same surface.

Another feature of the present invention is that in use such surface is always completely covered by one or the other of such cables (e.g., at the end of the traverse of the sludge collector), or collectively by portions of both of such cables (during such traverse), except for one uncovered area defined by one half of a turn of one of such cables.

Yet another feature of the present invention is that such cables are wound in opposite directions on such surface of such drum in such manner as to simultaneously pay out one of such cables and take up the other of such cables from diametrically opposite sides of such surface so that such uncovered area is directly between such cables as they are respectively taken up and payed out.

An additional feature of the present invention resides in the use of guides in the basin for directing the cables upwardly out of the basin to the drum in substantially the same plane, wherein the plane oscillates within an acute angle as the uncovered area is located at different axial positions across the drum, and wherein the value of such acute angle is relatively small so that the cables do not overlap.

A still further feature of the present invention is a method of preparing a reel for traversing a carriage (such as a sludge collector) along a traverse distance from one end of a clarifier basin to an opposite end of such basin, where such carriage has opposite surfaces and the reel has a cylindrical drum defined by opposite sides, wherein a first cable holder is adjacent to one such side of the drum and a second cable holder is adjacent to such other side of the drum, and diametrically opposed thereto. The method includes steps of providing first and second cables each having a length equal to at least such traverse distance. The first cable is secured to the first holder and the reel is rotated to take up the length of the first cable (the traverse distance) in a single layer on the drum. With the first cable extending off the drum at a position diametrically opposed to the second holder, the second cable is secured to the second holder. The carriage is positioned at one end of the traverse distance of the basin. The first cable is then attached to such one opposite surface of the carriage and the second cable is attached to the other such opposite surface of the carriage.

With these and other features of the present invention in mind, the present invention contemplates apparatus for simultaneously taking up and paying out first and second ends of respective first and second cables, each of the cables having an active length extending from the respective one of the first and second ends. The active length of one of the cables is substantially equal to the active length of the other of the cables. In the apparatus, a reel has a cylindrical drum, opposite ends, and a pair of cable retainers, one of the retainers being adjacent to one of the opposite ends and on a first diametric side of the drum, the other of the retainers being adjacent to the other of the opposite ends and on a second or opposite diametric side of the drum. The second diametric side is opposite to the first diametric side. The first end of the first cable is secured to the one retainer and the second end of the second cable is secured to the other retainer. The drum is adapted to receive all of the active length of the first cable in one layer thereon or all of such active length of the second cable in one layer thereon or a wound portion of the active length of each of the cables in one layer thereon. The wound one layer portions share the drum in side-by-side relation. An unwound portion of the active length of the first cable extends off the drum from one of the diametric sides of the drum at a given axial position along the drum. An unwound portion of the active length of the second cable extends off the drum from an opposite one of the diametric sides of the drum at the given axial position along the drum. A drive is used to rotate the reel to simultaneously pay out the wound portion of the active length of the first cable from the shared drum and uncover the drum at the axial position, and to take up the unwound portion of the active length of the second cable onto the uncovered shared drum at the axial position.

In another aspect of the present invention, there is provided apparatus for reciprocating a carriage having first and second opposite sides. The carriage is movable in a clarifier basin in first and second opposite directions along a path having a traverse distance. A first cable has one end secured to the first side of said carriage and an active length substantially equal to the traverse distance. A second cable has one end secured to the second side of the carriage and an active length also substantially equal to the traverse distance. A reel is provided having a pair of spaced ends, a drum between such ends, and at each such end and on opposite diametrically opposed sides of the drum a holder for the cables. One end of the first cable is secured to one of the holders and the one end of the second cable is secured to the other of the holders. The active lengths of the first and second cables extend from the holders and share the drum by being wound on the drum in opposite directions and then extend off the drum from opposite diametrically opposed sides of the drum to the respective sides of the carriage. A drive is provided for rotating the reel to pay out the active length of the first cable from an axial portion of the drum and simultaneously take up onto the axial portion such active length of the second cable. The payed out active length of the first cable allows the carriage to move in the clarifier basin in the first directions along the path through the traverse distance under the pull of the second cable which is taken up on the drum. Once the active length of the second cable is completely taken up on the drum, the first cable is completely payed out from the drum in exchange for the first cable. The direction of rotation of the reel is reversed and the exchange of the cables repeats to reverse the direction of traverse of the carriage in the basin.

BRIEF DESCRIPTION OF THE DRAWINGS

Other features and advantages of the present invention will be apparent from an examination of the following detailed descriptions which include the attached drawings in which:

FIG. 9 is a flow chart showing the steps of the method of the present invention for preparing the drum for use in traversing the carriage in the basin.

DETAILED DESCRIPTION

Clarifier Basin 20

Figure 1A:
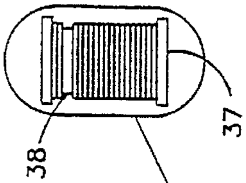
FIG. 1 is a plan view of clarifier basin with which the drive of the present invention is used.
Figure 1:
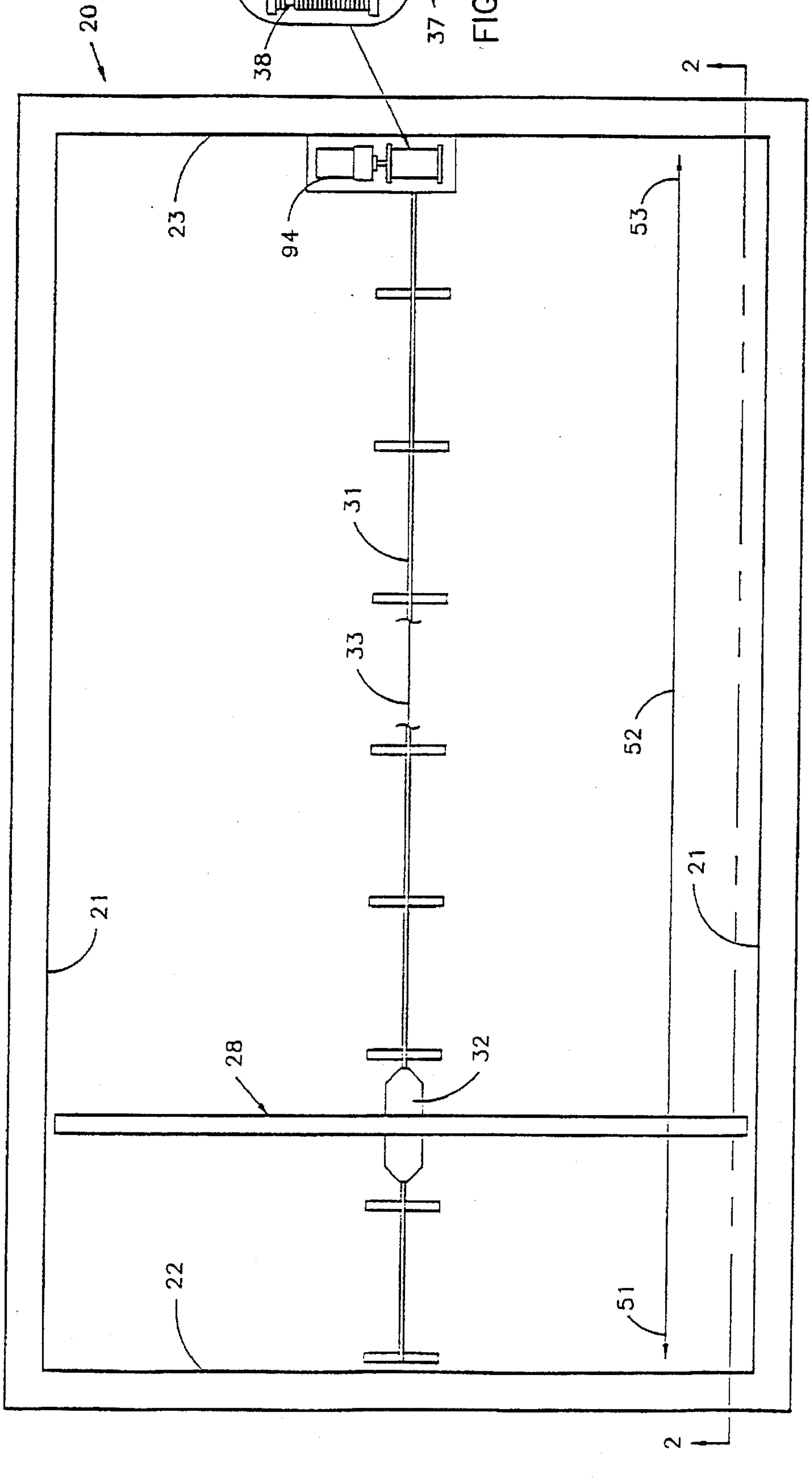
Figure 2:
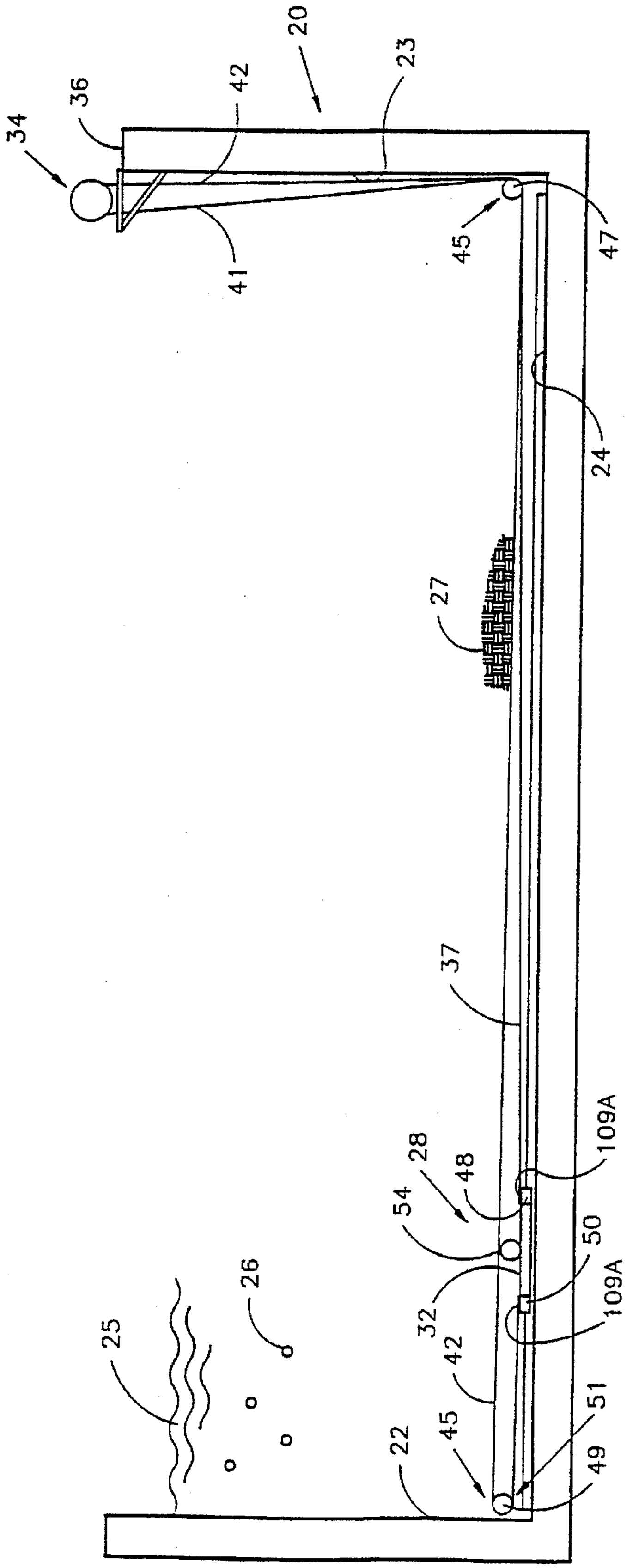
FIG. 2 is an elevational view of the basin shown in FIG. 1, illustrating cables attached to a carriage which is driven by the drive.

Referring now to FIGS. 1 and 2, a clarifier basin 20 is shown having lateral walls 21 and a left wall 22 and a right wall 23. In FIG. 2 a bottom 24 of the basin 20 is shown. The basin 20 contains liquid 25 and particles 26 suspended in the liquid 25. The particles 26 tend to settle to the bottom 24 and form a layer of sludge 27. In FIG. 1 a sludge collector 28 is shown including a track 31 which extends between the respective left and right walls 22 and 23 to guide a carriage 32 in a longitudinal path 33. The carriage 32 may be constructed according to U.S. Pat. No. 4,401,376 issued in Applicant's name, except that a drive 34 of the present invention is used in place of the stepping mechanism described therein.

Drive 34

The drive 34 of the present invention is mounted at the top 36 of the basin 20. The drive 34 includes a reel 37 having a drum 38 which simultaneously respectively pays out and takes up first and second cables 41 and 42 which extend down into the basin 20 around guides 45 (e.g., pulleys). The first cable 41 extends around a first pulley 47 and is secured to one end 48 of the carriage 32, whereas the second cable 42 extends around the first pulley 47, past the carriage 32 and around a second pulley 49 and is secured to an opposite end 50 of the carriage 32. It may be understood then that as the first cable 41 is payed out and the second cable 42 is taken up onto the drum 38, the carriage 32 is moved to the left in FIG. 2 until the carriage 32 reaches the left wall 22 of the basin 20, which is at the left end 51 of a traverse distance 52 (FIG. 1). The direction of rotation of the reel 37 (and the drum 38) is reversed so that the drum 38 simultaneously respectively pays out and takes up the second and first cables 42 and 41 to reverse the direction of traverse of the carriage 32 along the track 31 until the carriage 32 reaches the right wall 23 of the basin 20 at the opposite end 53 of the traverse distance 52.

Cables 41 and 42

Figure 3:
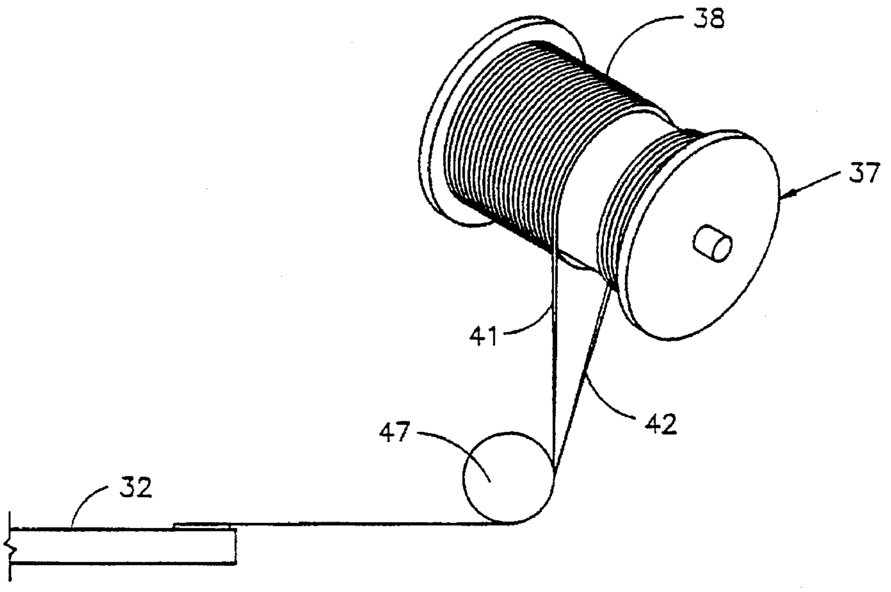
FIG. 3 is a perspective view of the drive showing two cables extending from a drum to the carriage.
Figure 4A:
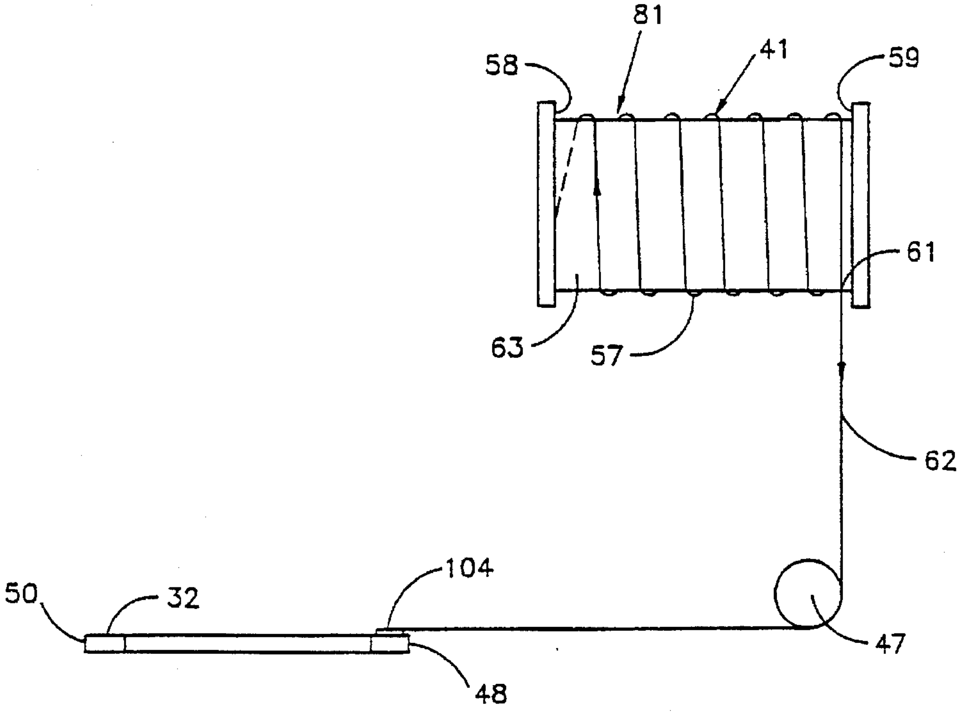
FIGS. 4*a* and 4*b* are schematic drawings showing active lengths of first and second ones of the cables.

Referring to FIGS. 3 and 4*a*, it is to be understood that each of the cables 41 and 42 has an active length 57. In FIG. 4*a* the active length 57 of the first cable 41 is shown diagrammatically extending from a left drum end 58 and wrapped around the entire length of the drum 38 to an opposite or right drum end 59. The active length 57 terminates at an end 61. A further length 62 of the first cable 41 extends from the end 61 of the active length 57 at the right drum end 59 around the pulley 47 to the carriage 32 and terminates at the respective right carriage end 48. The active length 57 of one of the cables 41 and 42 is substantially equal to the active length 57 of the other of the cables 41 and 42. Each of such active cable lengths 57 equals the traverse distance 52 (FIG. 1), which is the distance through which the carriage 32 is traversed along the track 31 between the respective left and right walls 22 and 23. For purposes described below, each cable 41 and 42 has a diameter in a range from three sixteenths of an inch to about five sixteenths of an inch.

Drum 38

The drive 34 includes the reel 37 which has the drum 38 in the form of a cylinder and the opposite drum ends 58 and 59. The drum 38 has a surface 63 which is cylindrical and which extends from one drum end 58 to the other drum end 59. As described below, this surface 63 is described as being capable of separately supporting the entire active length 57 of the first or the second cables 41 and 42, respectively. When only part of the active length 57 of each such cable 41 or 42 is wound on the drum 38 (FIG. 6*a*), the cables 41 and 42 are said to "share" such surface 63. The drum 38 is provided with a pair of cable retainers, one retainer 66 being adjacent to the right one of the opposite drum ends 59 of the drum 38 and on a first diametric side 67 of the drum 38. The other of the retainers 68 is adjacent to the left opposite drum end 58 of the drum 38 and on a second opposite diametric side 71 of the drum 38. As shown on FIG. 7, the second diametric side 71 of the drum 38 is diametrically opposite to the first diametric side 67 of the drum 38 and spaced therefrom by the length of the drum 38. A cable drum end 72 of the first cable 41 is secured to the drum 38 by being secured to the left retainer 68, whereas a cable drum end 73 of the second cable 42 is secured to the other (or right) retainer 66.

Figure 5:
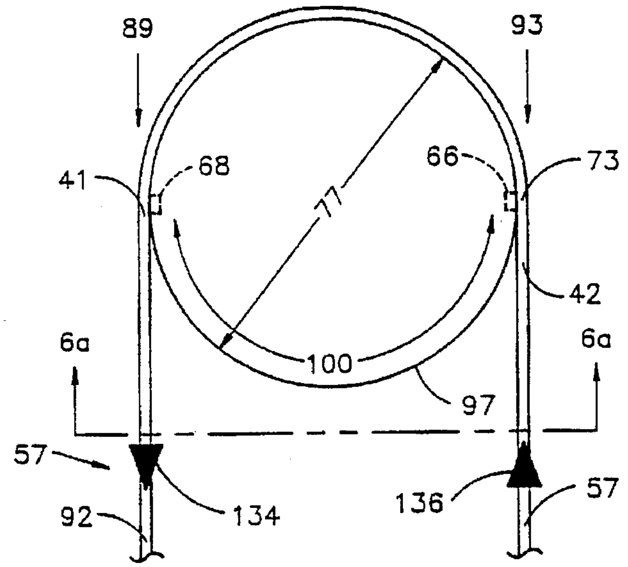
FIG. 5 is an end view of the drum showing the two cables being respectively payed out from and taken up onto the drum, with an uncovered portion of the surface of the drum shown between the cables at a given axial location along the drum.
Figure 6A:
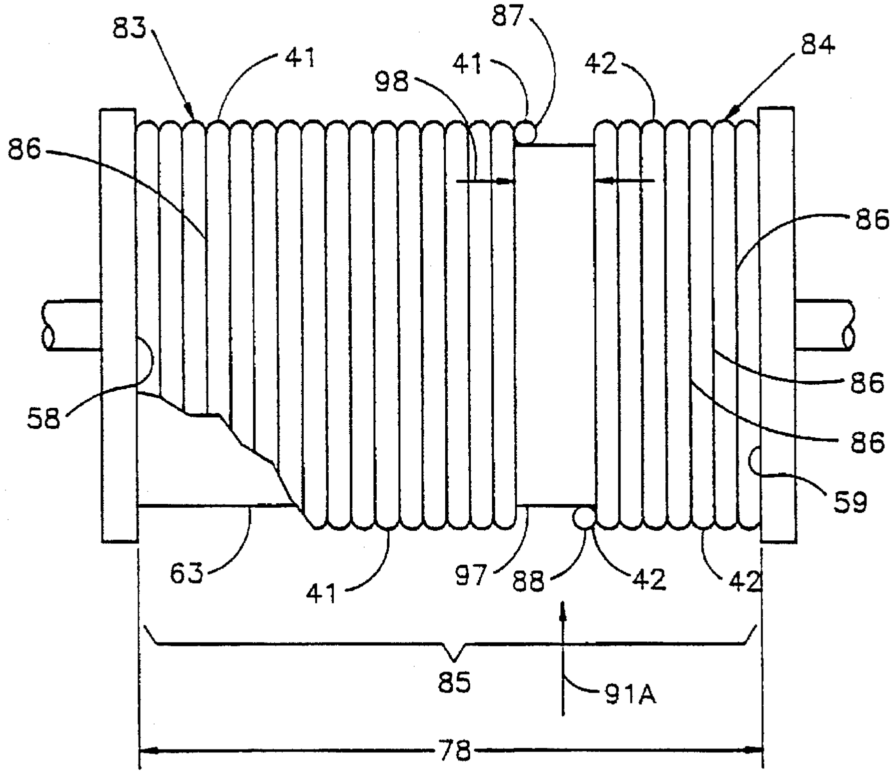
FIGS. 6*a*, 6*b* and 6*c* are successive upwardly looking schematic views of the drum shown in FIG. 5, illustrating the different axial locations of the uncovered portion as the drum rotates.

The drum 38 is designed to have a selected diameter 77 (FIG. 5) and length 78 (FIG. 6*a*) between the ends 58 and 59 to receive all of the active length 57 of the first cable 41 in one layer 81 (FIG. 4*a*) thereon, or all of the active length 57 of the second cable 42 in one layer 82 (FIG. 4*b*) thereon, or both a wound portion (or part) 83 of the active length 57 of the first cable 41 and a wound portion (or part) 84 of the active length 57 of the second cable 42, which combine to form one layer 85 on the drum surface 63 (FIG. 6*a*). Still referring to FIG. 6*a*, each single layer 81, 82 or 85 is formed from tightly packed or wound turns 86 of the cable 41 or 42 which are wound directly on the surface 63 of the drum 38. Such turns 86 of the wound one layer portions 83 or 84 of the respective first and second cables 41 and 42 share the drum 38, and are said to be in side-by-side relation because the right end 87 of the one wound portion 83 of the first cable 41 is immediately adjacent to the left end 88 of the wound portion 84 of the second cable 42.

Different Axial Locations 91

Figure 6B:
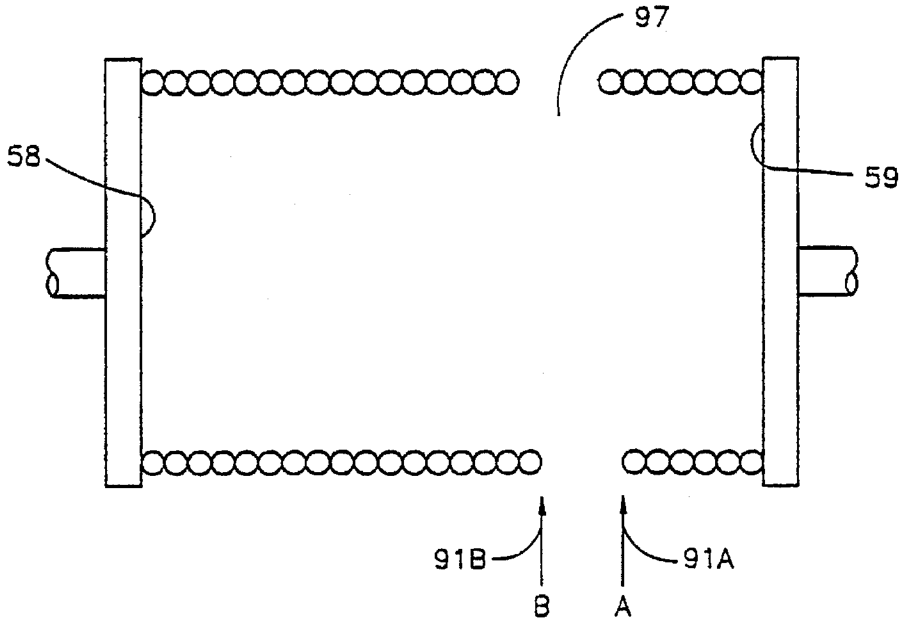
Figure 6C:
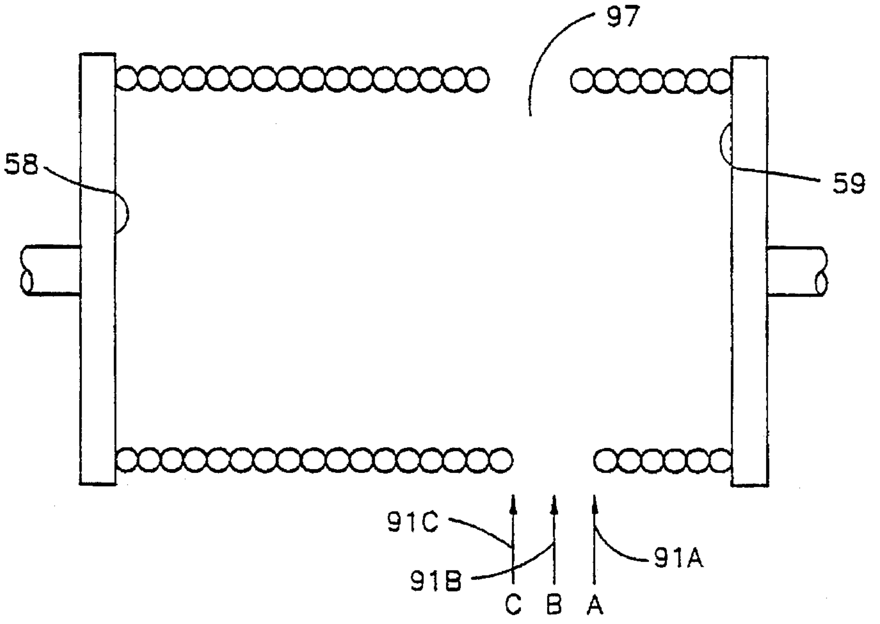
Figure 7:
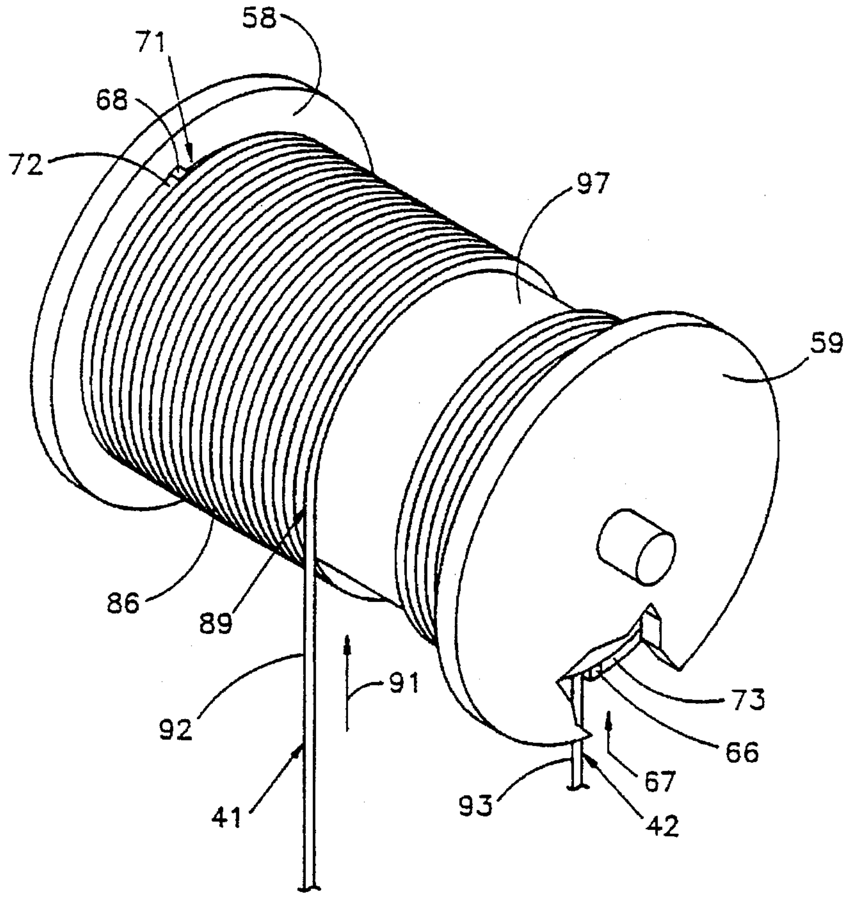
FIG. 7 is a perspective view of the drum showing retainers for securing the cables to the drum.

An unwound portion 92 of the active length 57 of the first cable 41 is shown in FIG. 7 extending off the drum 38 from one diametric side 89 of the drum 38 at a given axial position 91 (see also FIGS. 6*a*–6*c*) along the drum 38. An unwound portion 93 of the active length 57 of the second cable 42 is shown in FIG. 5 extending off the drum 38 from a diametrically opposite diametric side 93 (see FIG. 5) of the drum 38 at the same given axial location 91 along the drum 38. A drive motor 94 (FIG. 1) is provided for rotating the reel 37, for example, to simultaneously pay out the wound portion 83 of the active length 57 of the first cable 41 from the shared surface 63 of the drum 38. Such paying out uncovers the drum 38 at such given axial location 91 to form an uncovered area 97 (FIG. 6a) of the drum 38. The uncovered area 97 of the drum 38 has a width 98 equal to the diameter of the cable 41 or the cable 42. For ease of illustration, in FIGS. 3, 6a–6c and 7, the width 98 is shown greater than the diameter of the cable 41 or 42. Such uncovered area 97 has a curved length 100 (FIG. 5) extending from one diametric side 93 of the drum 38 clockwise around the drum 38 to the opposite diametric side 89 of the drum 38. The curved length 100 of the uncovered area 97 is less than the circumference of the drum 38. For example, such curved length 100 extends about half of the circumference of the surface 63 of the drum 38 because, as the cable 41 is unwound from one diametric side 89, at the opposite diametric side 93 of the drum 38 the second cable 42 is wound onto the surface 63 of the drum 38 at the same given axial location 91 and covers the drum 38.

In the operation of the drive motor 94, as shown in FIGS. 6a, 6b, and 6c, the uncovered area 97 is at successively different axially spaced ones of the axial locations 91 between the right opposite end 59 of the drum 38 and the left end 58 of the drum 38. In particular, as the drum 38 rotates, the uncovered area 97 of the surface 63 is positioned at successive locations 91 which are axially closer to one of the ends 58 or 59 of the drum 38. In greater detail, since the cables 41 and 42 wind onto the drum surface 63 in the helical turns 86, such paying out of the first cable 41 and taking up the second cable 42 causes the axial location 91 of the uncovered area 97 to be spaced axially along the drum 38. With each revolution of the drum 38, such locations 91 are axially spaced by a distance related to the pitch of the helical turns 86 of the cables 41 and 42 on the drum 38, such that the uncovered area 97 is at different respective axial locations 91A, 91B and 91C along the drum 38 as shown in the successive FIGS. 6a, 6b, and 6c. It should be clear from those FIGS. that the reference to the fact that the two cables 41 and 42 "share" the surface 63 of the drum 38 indicates that the one surface 63 of the drum 38 is alternately covered by one of the cables (e.g., 41) and then by parts of both cables 41 and 42 and then by the other of the cables (e.g., 42), such that in this sense, over time, the active lengths 57 of the cables 41 and 42 share the same surface 63 of the drum 38.

Method of Preparing The Drum 38 For Traversing the Carriage 32

Figure 4B:
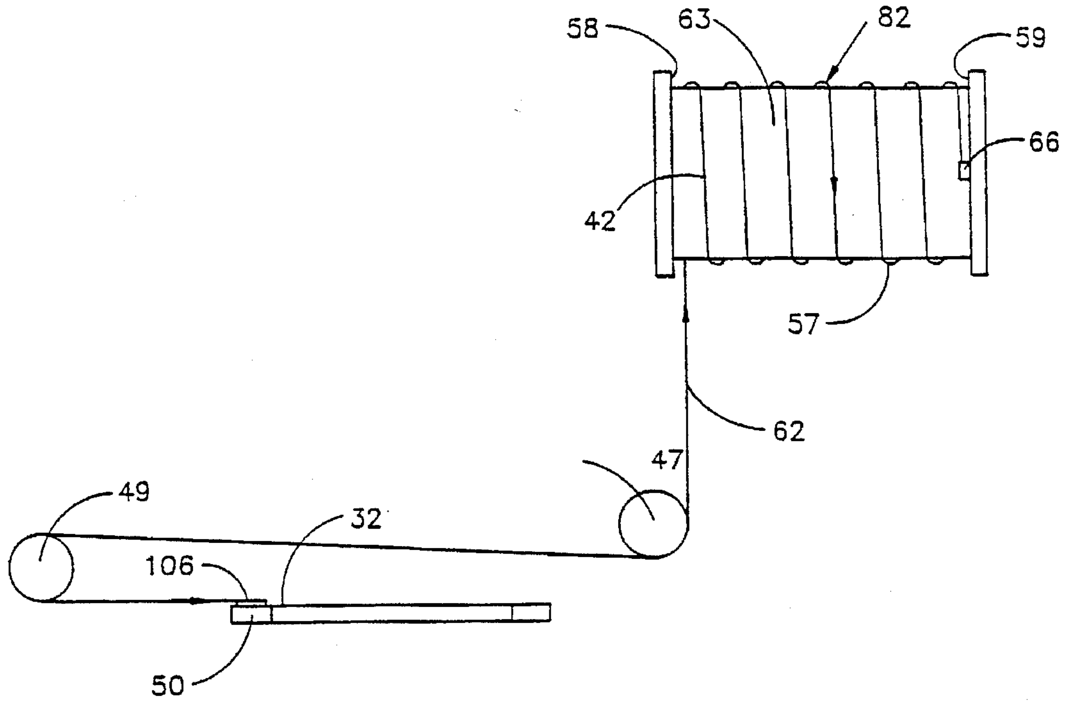

The present invention includes a method of preparing the drum 38 for traversing the carriage 32 along the traverse distance 52 between the walls 22 and 23 of the basin 20. The carriage 32 has been described as having the opposite ends 48 and 50, and the reel 37 as having the first cable retainer or holder 66 adjacent to one end 59 of the drum 38, and the second cable retainer or holder 68 adjacent to the other end 58 of the drum 38 and diametrically opposed to the first such holder 66. Referring to FIG. 9, the method includes a step 120 of providing the first and second cables 41 and 42, each having a length equal to at least the traverse distance 52, which is the active length 57. Usually, however, the length of the cables 41 and 42 will be the active length 57 plus the length 62. In step 122, securing the drum end 72 of the first cable 41 to the left holder 68 is performed (FIG. 5), and then the reel 37 is rotated to take up the entire active length 57 of the first cable 41 in the single layer 81 on the drum 38. With the remaining portion 62 of the length of the first cable 41 extending off the drum 38 at the one diametric position 89, there is then the step 124 of securing the drum end 73 of the second cable 42 to the other (right) holder 66 (FIG. 5). Next, there is a step 126 of positioning the carriage 32 at one end of the traverse distance 52 of the basin 20; in this example at the right wall 23. In a step 128, the carriage end 104 of the first cable 41 is attached to the right end 48 of the carriage 32 (FIG. 4a). A carriage end 106 of the second cable 42 is attached in a step 130 to the opposite end 50 of the carriage 32 (FIG. 4b). At this time, the first cable 41 is at one diametrically opposed side 89 (FIG. 5) of the drum 38, the uncovered area 97 of the drum 38 is next to the right end 59 (FIG. 6a) of the drum 38, and the drum end 73 of the second cable 42 is at the other diametrically opposed side 93 (FIG. 5) of the drum 38.

The drive 34 of the present invention may then be used to traverse the carriage 32 on the track 31 by turning on the drive motor 94. In the operation of the drive motor 94 to rotate the drum 38, the first cable 41 is payed out from the drum 38 (see arrow 134 in FIG. 5) and the second cable 42 is at the same time taken up on the drum 38 (see arrow 136 in FIG. 5). One or the other or both of the cables 41 and 42 always cover the drum surface 63 except for the uncovered area 97, which in the examples shown in FIGS. 6a, 6b, and 6c, is at successively different ones of the axial locations 91A, 91B, and 91C between the one opposite end 58 of the drum 38 and the other end 59 of the drum 38. As described above, the second cable 42 winds onto the drum surface 63 in the helical turns 86. Such paying out of the first cable 41 and taking up the second cable 42 causes the uncovered area 97 to appear at the successive axial locations (such as 91A) along the drum 38 as shown in the successive FIGS. 6a, 6b and 6c. As the first cable 41 pays out from the surface 63 the second cable 42 is exchanged for the first cable 41 such that, as shown in those FIGS., the two cables 41 and 42 share the surface 63 of the drum 38 by alternately combining to cover and then separately completely covering the drum surface 63.

Angle of Cable Feed To The Drum 38

Figure 8:
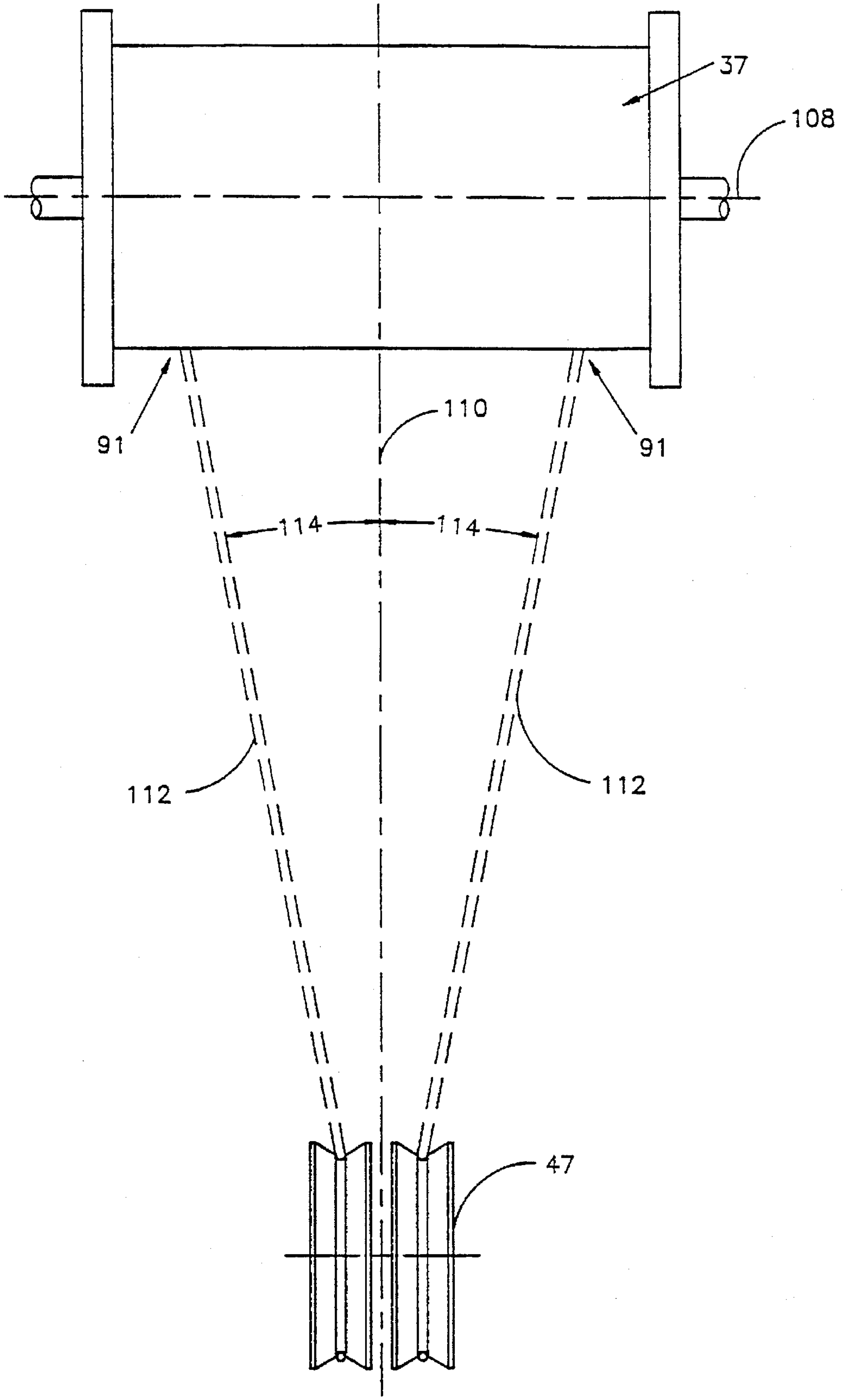
FIG. 8 is an elevational view of the reel and a pulley around which the cables pass, showing an angle through which the cables move as the cable is taken up onto the different axial locations of the surface of the drum.

In another aspect of the present invention, and as shown in FIG. 8, the reel 37 is positioned above the first pulley 47 and centered thereabove so that a center 108 of the reel 37 is above the pulley 47. The pulley 47 is about as much as six feet below the reel 37 and defines a vertical axis 110. As the above-described paying out and taking up of the cables 41 and 42 occurs, and as the axial location 91 of the exchange of the cables 41 and 42 on the drum surface 63 occurs, the cables 41 and 42 will take or follow a path 112 (see dashed lines in FIG. 8) from the pulley 47 to the axial exchange location 91. Such path 112 oscillates around the pulley 47 relative to the vertical axis 110 through an acute angle 114. With the six foot spacing between the pulley 47 and the drum 38, the angle 114 is about 2.5 degrees from the vertical axis 110. With such acute angle 114 of about 2.5 degrees, and the cables 41 and 42 having a diameter in such range from three sixteenths of an inch to five sixteenths of an inch, the cable (41 or 42) which is being taken up onto the drum surface 63 touches but does not ride onto the adjacent turn 86 of the other cable which is on the drum surface 63. Therefore, no cable guide is required.

While the preferred embodiments of the present invention have been described in order to show the principles of the invention, it should be understood that numerous variations and modifications may be made to these embodiments without departing from the teachings of the present invention. Therefore, the form of the present invention described above is only illustrative and should not limit the scope of the invention to less than that described in the following claims.

What is claimed is:

1. Apparatus for simultaneously taking up and paying out first and second ends of respective first and second cables, each of said cables having an active length extending from said respective one of said first and second ends, said active length of one said cable being substantially equal to said active length of the other of said cables; said apparatus comprising:

a reel comprising a cylindrical drum having opposite ends; and a pair of cable retainers, one of said retainers being adjacent to one of said opposite ends and on a first diametric side of said drum, the other of said retainers being adjacent to the other of said opposite ends and on a second diametric side of said drum, said second diametric side being opposite to said first diametric side;

said first end of said first cable being secured to said one retainer and said second end of said second cable being secured to said other retainer;

said drum having a surface defined by a diameter and a width between said opposite ends, said surface having a surface area receptive all of said active length of said first cable in one layer thereon or all of said active length of said second cable in one layer thereon or a wound portion of said active length of each of said cables in one layer thereon, said wound one layer portions sharing said drum in side by side relation;

an unwound portion of said active length of said first cable extending off said drum from a third diametric side of said drum at a given axial position along said drum; and an unwound portion of said active length of said second cable extending off said drum from a fourth diametric side of said drum at said given axial position along said drum and diametrically opposite to said third side;

said reel being adapt out said wound to simultaneously pay out said wound portion of said active length of said first cable from said drum and uncover a portion of said area of said drum at said axial position, and take up said unwound portion of said active length of said second cable on said uncovered portion of said area of said drum at said axial position.

2. Apparatus according to claim 1, further comprising:

said drum having said width defined by said opposite ends;

said width and said diameter defining said surface area of said drum such that said one layer of either said first cable or said second cable covers said drum from one of said ends to the other of said ends leaving said uncovered portion of said area of said drum of a one-half cable turn adjacent to one of said opposite ends.

3. Apparatus according to claim 2, further comprising:

in said rotation of said reel to pay out said one of said first or second cables which covers said drum, said uncovered portion of said area being at successively different ones of said axial positions between said one opposite end and said other of said opposite ends.

4. Apparatus according to claim 3, further comprising:

as said uncovered portion of said area is at successive ones of said different axial positions between said one opposite end and said other of said opposite ends, said unwound portion of said active length of the other one of said first or second cables being wound on said drum at said successive different axial positions.

5. In an apparatus for moving equipment in a clarifier basin provided with opposite ends and sides between said ends, said equipment being movable along a path between said ends through a traverse distance; said apparatus comprising:

a first cable secured to one end of said equipment, said first cable having a first active length equal to said traverse distance;

a second cable secured to an opposite end of said equipment, said second cable having a second active length equal to said traverse distance;

guides mounted to said basin to guide said first and second cables adjacent to each other and out of said basin; and a reel mounted for rotation out of said basin and having a drum provided with a cable receiving surface for receiving all or a portion of said first active length in a single layer directly on said drum and receiving a respective portion or all of said second active length in a single layer directly on said drum;

said first active length and said second active length being wound on said surface in opposite directions so that upon rotation of said drum in a given direction said drum simultaneously pays out said second active length from an area of said surface and takes up said first active length onto said area of said drum, wherein said active lengths share said surface of said drum.

6. Apparatus according to claim 5, further comprising:

said guides guide said first and second cables out of said basin in generally the same plane and onto diametrically opposite sides of said drum, said plane extending from said area of said drum to said guides.

7. Apparatus according to claim 6, further comprising:

said drum having opposite ends and a center between said ends;

said cables having a diameter in a range from three sixteenths of an inch to about five sixteenths of an inch;

as said drum rotates, said area of said surface being positioned at successive positions which are axially closer to one of said ends of said drum;

said guides being spaced from said drum in said plane by no more than a selected distance so that as said areas of said surface are axially positioned adjacent to either of said opposite ends said plane of said first and second cables is at about an angle not to exceed 2.5 degrees with respect to said center of said drum and said cables having said diameter in said range position themselves on said drum without overlapping said respective single layer which is on said drum.

8. Apparatus for reciprocating a carriage having first and second opposite sides, said carriage being movable in first and second opposite directions along a traverse distance, said apparatus comprising:

a first cable having one end secured to said first side of said carriage, and having another end, and having an active length substantially equal to said traverse distance;

a second cable having one end secured to said second side of said carriage, and having another end, and having an active length substantially equal to said traverse distance;

a reel comprising a pair of spaced ends, a drum between said ends, and at each said end and on diametrically opposed sides of said drum a holder for said cables, said another end of said first cable being secured to one of said holders and said another end of said second cable being secured to the other of said holders;

said active lengths of said first and second cables extending from said holders and sharing said drum by being wound on said drum in opposite directions and then extending off said drum from opposite diametrically opposed sides of said drum to said sides of said carriage; and a drive for rotating said reel to pay out said active length of said first cable from an axial portion of said drum and simultaneously take up onto said axial portion said active length of said second cable.

9. A method of preparing a reel for traversing a carriage along a traverse distance from one end of a basin to an opposite end of said basin, said carriage having first and second opposite surfaces, said reel having a cylindrical drum defined by opposite sides, wherein a first cable holder is adjacent to one said side and a second holder is adjacent to said other side and diametrically opposed thereto; said method comprising the steps of:

providing first and second cables each having a length equal to at least said traverse distance;

securing said first cable to said first holder;

rotating said reel in a first direction to take up said length of said first cable in a single layer on said drum with said single layer of said first cable extending across said drum from one of said opposite sides to the other of said opposite sides;

securing said second cable to said second holder so that upon rotation of said reel in a direction opposite to said first direction said second cable is taken up on said drum;

positioning said carriage at one end of said traverse distance of said basin; and attaching said first cable to said first opposite surface of said carriage and attaching said second cable to said second surface of said carriage.

10. Apparatus for simultaneously taking up and paying out first and second ends of respective first and second cables, each of said cables having an active length extending from said respective one of said first and second ends, said active length of one said cable being substantially equal to said active length of the other of said cables; said apparatus comprising:

a reel comprising a cylindrical drum, opposite ends, and a pair of cable retainers, one of said retainers being adjacent to one of said opposite ends and on a first diametric side of said drum, the other of said retainers being adjacent to the other of said opposite ends and on a second diametric side of said drum, said second diametric side being opposite to said first diametric side;

said first end of said first cable being secured to said one retainer and said second end of said second cable being secured to said other retainer;

said drum having a surface defined by a diameter and a width between said opposite ends, said surface having an area receptive to all of said active length of said first cable in one layer thereon or all of said active length of said second cable in one layer thereon or a wound portion of said active length of each of said cables in one layer thereon, said wound one layer portions sharing said drum in side-by-side relation;

an unwound portion of said active length of said first cable extending off said drum from a third diametric side of said drum at a given axial position along said drum;

an unwound portion of said active length of said second cable extending off said drum from a fourth diametric side of said drum at said given axial position along said drum and diametrically opposite to said third side; and a drive for rotating said reel to simultaneously pay out said wound portion of said active length of said first cable from said drum and uncover an area of said drum at said axial position, and take up said unwound portion of said active length of said second cable on said uncovered area of said drum at said axial position.

11. Apparatus for reciprocating a carriage having first and second opposite sides, said carriage being movable in first and second opposite directions along a traverse distance, said apparatus comprising:

a first cable having one end secured to said first side of said carriage, and having another end, and having an active length substantially equal to said traverse distance;

a second cable having one end secured to said second side of said carriage, and having another end, and having an active length substantially equal to said traverse distance;

a reel comprising a pair of spaced ends, a drum between said ends, and at each said end and on diametrically opposed sides of said drum a holder for said cables, said another end of said first cable being secured to one of said holders and said another end of said second cable being secured to the other of said holders;

said active lengths of said first and second cables extending from said holders and sharing said drum by being wound on said drum in opposite directions and then extending off said drum from opposite diametrically opposed sides of said drum to said sides of said carriage; and a drive for rotating said reel to pay out said active length of said first cable from an axial portion of said drum and simultaneously take up onto said axial portion said active length of said second cable, such that as said drive rotates said reel said axial portion of said drum is positioned at successive different positions toward one of said spaced ends of said reel until one of said cables is no longer wound on said reel and is held by its respective holder and said active length of said other cable is completely wound on said drum and said carriage is positioned at one end of said traverse distance.

12. A method of preparing a reel for traversing a carriage along a traverse distance from one end of a basin to an opposite end of said basin, said carriage having first and second opposite surfaces, said reel having a cylindrical drum defined by opposite sides, wherein a first cable holder is adjacent to one said side and a second holder is adjacent to said other side and diametrically opposed thereto; said method comprising the steps of;

providing first and second cables each having a length equal to at least said traverse distance;

securing said first cable to said first holder;

rotating said reel to take up said length of said first cable in a single layer on said drum;

securing said second cable to said second holder;

positioning said carriage at one end of said traverse distance of said basin;

attaching said first cable to said first opposite surface of said carriage and attaching said second cable to said second surface of said carriage; and selecting the diameter of said drum and the width of said drum between said opposite sides so that said drum has a surface area sufficient to receive either said length of said first or said second cable on said drum with said entire length completely covering said drum except for an uncovered area of said drum between said first and second cables at one axial location of said drum.

13. A method according to claim 12, wherein said carriage is traversed between said ends of said basin, further comprising:

rotating said reel in a given direction so as to pay out said first cable from said drum and take up said second cable on said uncovered area of said drum.

14. A method according to claim 13, further comprising the steps of:

further rotating said reel to continue to pay out said first cable from said drum and uncover successive axially spaced areas of said drum and to continue to take up said second cable onto said successive axially spaced areas of said drum until said length of said second cable is entirely wound on said drum and said carriage has completely traversed said traverse distance and said length of said first cable has been entirely unwound from said drum.

* * * * *